US005701594A

United States Patent [19]
Bath et al.

[11] Patent Number: 5,701,594
[45] Date of Patent: Dec. 23, 1997

[54] TRANSMITTER/RECEIVER FOR A TDMA SYSTEM USING COMMON IF SAW FILTER

[75] Inventors: Gareth John Richard Bath, Winchester; Steven Richard Ring, Bracknell, both of England

[73] Assignee: Nokia Mobile Phones Limited, Espoo, Finland

[21] Appl. No.: 150,464

[22] Filed: Nov. 10, 1993

[30] Foreign Application Priority Data

Nov. 11, 1992 [GB] United Kingdom ............. 09223621

[51] Int. Cl.$^6$ ............................................. H04B 1/44
[52] U.S. Cl. ..................... 455/78; 455/84; 455/307; 370/280
[58] Field of Search ............................ 455/78, 79, 82, 455/83, 84, 85, 86, 87, 89, 90, 306, 307, 76, 80; 307/494; 370/29, 32, 280, 294; 333/133

[56] References Cited

U.S. PATENT DOCUMENTS

| | | | |
|---|---|---|---|
| 4,097,805 | 6/1978 | Fujii et al. | 455/78 X |
| 4,162,446 | 7/1979 | Cochran | 325/15 |
| 4,172,995 | 10/1979 | Yoshisato | 325/17 |
| 4,907,291 | 3/1990 | Yamamoto | 455/78 |
| 5,179,360 | 1/1993 | Suzuki | 455/86 X |
| 5,182,477 | 1/1993 | Yamasaki et al. | 307/494 |
| 5,204,972 | 4/1993 | Hashimoto | 455/307 X |
| 5,220,557 | 6/1993 | Kelley | 455/84 X |
| 5,301,367 | 4/1994 | Heinonen | 455/86 X |
| 5,355,524 | 10/1994 | Higgins, Jr. | 455/90 X |
| 5,444,863 | 8/1995 | Torii | 455/83 |

FOREIGN PATENT DOCUMENTS

| | | |
|---|---|---|
| 0398688 | 11/1990 | European Pat. Off. . |
| 0496498 | 7/1992 | European Pat. Off. . |
| 0514200 | 11/1992 | European Pat. Off. . |
| 1060860 | 3/1967 | United Kingdom . |
| WO 85/00481 | 1/1985 | WIPO . |

OTHER PUBLICATIONS

Van De Vaart, Surface Acoustic Wave Multiplexing Techniques, Proceedings of the IEEE, vol. 64, No. 5, May, 1976.
Patent Abstracts of Japan, vol. 9, No. 258 (E–350), Oct. 16, 1985, 1 p.
Patent Abstracts of Japan, vol. 6, No. 147 (E–123), Aug. 6, 1982, 1 pag.
Patent Abstracts of Japan, vol. 15, No. 476 (E–1140), Dec. 4, 1991, 1 p.
"Ultra–Small SAW Filter Works in Mobile Communication" by Eda, Journal of Electronic Engineering, May 1992, Tokyo, Japan.

Primary Examiner—Reinhard J. Eisenzopf
Assistant Examiner—Philip J. Sobutka
Attorney, Agent, or Firm—Perman & Green, LLP

[57] ABSTRACT

A radio frequency circuit for a TDMA mobile telephone system allows bulky and expensive IF filters to be saved by sharing common filters between transmit and receive channels by automatic switching of bidirectional SAW filters.

9 Claims, 1 Drawing Sheet

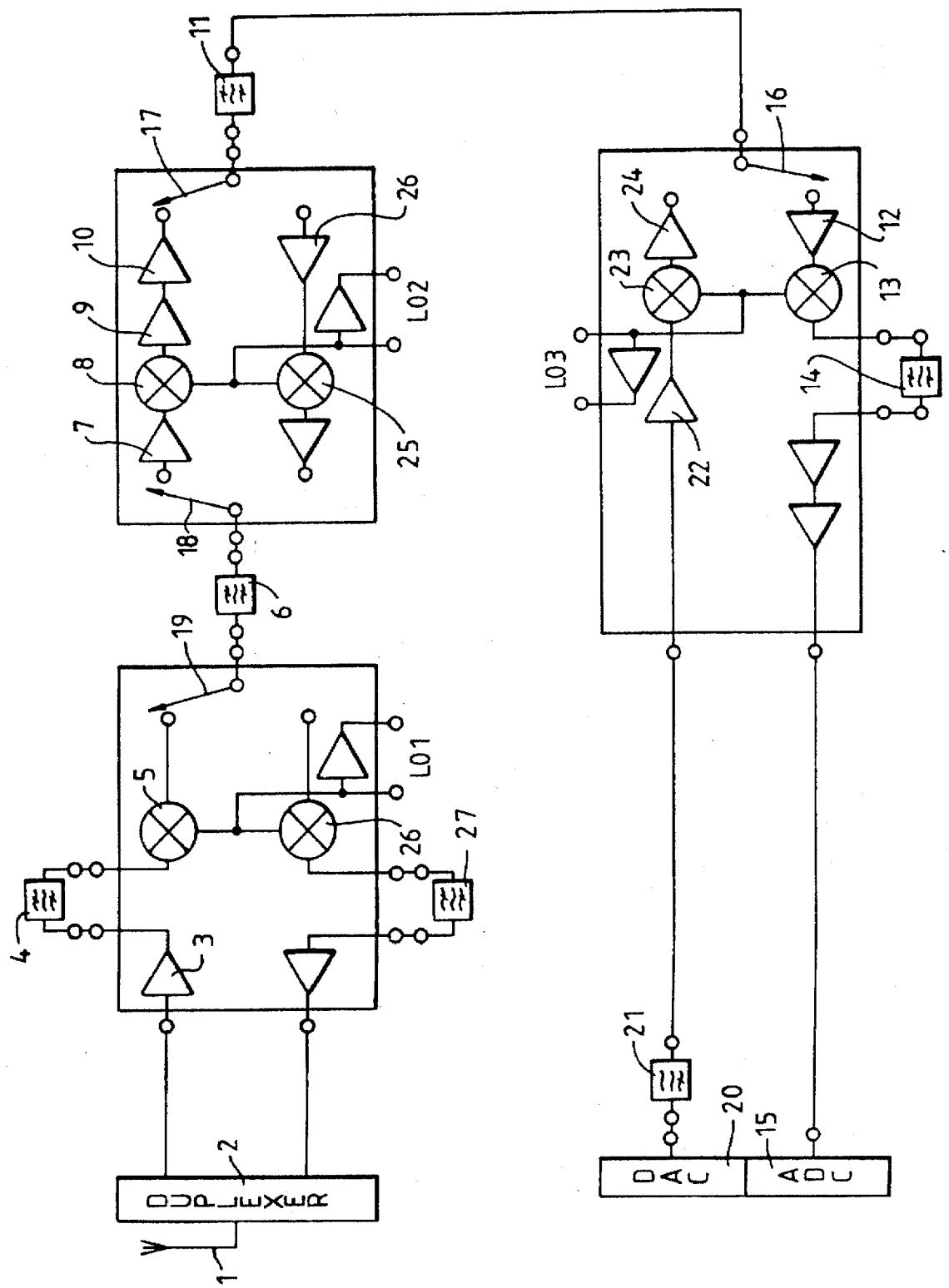

TRANSMITTER/RECEIVER FOR A TDMA SYSTEM USING COMMON IF SAW FILTER

The invention relates to a radio frequency circuit for a time division multiple access (TDMA) system. TDMA systems are used in digital mobile telephone systems, examples of which are the Personal Communication Network (PCN) and the Groupe Speciale Mobile (GSM) systems.

The present invention seeks to provide economies in the cost and size of the transmitter/receiver units for such systems which has particular advantage in hand-held units. The transmitter/receiver units employ direct digital synthesis to achieve a modulated signal for transmission and digital demodulation techniques are also used. As a consequence, digital to analogue and analogue to digital convertors (DACs and ADCs) are used to interface the modulator/demodulator with the radio frequency circuits. Limitations imposed by the DACs and ADCs require a low intermediate frequency as the input/output of the RF circuits. In turn this requires at least a two-stage heterodyning process with corresponding intermediate frequencies (IFs) and therefore at least two IF filters in each of the transmit and receive channels. Such filters are relatively bulky and costly and the present invention seeks to alleviate the problem.

According to the invention there is provided a radio frequency circuit for a transmitter/receiver in a time division multiple access system, the circuit having a transmit channel, a receive channel, at least one intermediate frequency filter and means responsive to whether the circuit is transmitting or receiving to switch the or at least one of the filters to the transmit or receive channel, thereby allowing the filter or filters to be shared by the transmit and receive channels.

Preferably the switchable filter is bidirectional, having the capacity to filter signals passing through it in either direction. Preferably each switchable filter is a SAW filter.

In a preferred arrangement the switchable filters are physically connected to both the transmit and receive circuits and switching is effected by control voltages applied to components in the transmit and receive circuits to switch the circuits on and off alternatively.

Preferably there are two intermediate frequencies of which the first (in the direction of the receive channel) may be in the range 350 to 450 MHz, and more particularly in the range 380 to 429 MHz. The second intermediate frequency may be in the range 80 to 160 MHz and more particularly in the range 120 to 140 MHz.

Because received signals suffer from phase distortion it is particularly important to provide an effective blocking filter. Preferably this takes the form of a transconductance-C active filter in the receive channel for filtering the signal resulting from heterodyning the second intermediate frequency.

If the first IF filter (in the direction of the receive channel) is shared, as is preferred, then steps must be taken to ensure that the first IF is the same for transmit and receive. In some systems, such as the CT2 system, for example, the transmit and receive frequencies are the same. However, where the broadcast transmit and receive signals are of different frequency ranges a feature of the invention is to provide a first receiving stage/final transmitting stage which has a local oscillator automatically switchable on transmit/receive to change frequency so that the first receive intermediate frequency and final transmit intermediate frequency are the same.

The invention will be further described with reference to the accompanying drawing of which the sole FIGURE is a block diagram of a radio frequency circuit in accordance with the invention.

Referring to the drawing there is shown a radio frequency circuit for a transmitter/receiver unit of a TDMA radio telephone system. The unit has an antenna 1 which is interfaced to receive and transmit channels via a duplexer 2.

Considering the example of a GSM system where there is a transmit broadcast channel from 890 to 915 MHz and a receive broadcast channel from 935 MHz to 960 MHz, the receive channel of the RF circuit operates in this example as follows. The duplexer 2 feeds an amplifier 3 which applies signals via a band-pass filter 4 to a mixer 5. A local oscillator provides a frequency of 1324 MHz to give sidebands of 389 and 2259 MHz. A first IF filter 6 is switched at this time to be in the receive channel and is set to pass the 389 MHz sideband as the first intermediate frequency.

The receive channel includes a further amplifier 7, a mixer 8 and two further amplifier stages 9, 10. A second local oscillator LO2 supplies a frequency of 260 MHz to give sidebands of 129 and 649 MHz. A second IF filter 11 is switched at this time to the receive channel and is set to pass the 129 MHz sideband as the second IF.

A further amplifier 12 supplies a mixer 13 which is also provided by a third local oscillator LO3 with a frequency of 130 MHz. This produces sidebands of 1 and 259 MHz. A transconductance-C active filter 14 rejects the 259 MHz sideband, leaving the 1 MHz signal to be fed to the low frequency digital demodulator (not shown) via an analogue to digital convertor 15.

In the transmit mode the circuit automatically switches over the channels and places the IF filters 6 and 11 in the transmit channel. Appropriate switches are shown symbolically at 16, 17, 18 and 19 but it is to be understood that switching is effected by biasing amplifiers in the channels which are physically permanently connected to the IF filters.

1 MHz signals from the low frequency digital modulator (not shown) are applied to the transmit channel via a digital to analogue convertor 20 and a low stop filter 21 to an amplifier 22, a mixer 23 and a further amplifier 24. In mixer 23 sidebands of 129 and 131 MHz are produced with the signal from local oscillator LO3. The 129 MHz signal is selected by filter 11. This and filter 6 are bidirectional SAW filters, operating similarly on signals passing in either direction.

The 129 MHz IF is mixed with the LO2 signal in mixer after passing through an amplifier 26. This produces sidebands of 389 and 131 MHz of which the 389 MHz signal is selected by filter 6 as the IF. This passes to a mixer 26. Instead of the receive frequency of 1324 MHz the local oscillator LO1 is now switched to produce a transmit frequency of 1729 MHz. This produces sidebands of 890 and 2188 MHz. The 2118 MHz signal is rejected by a filter 27 to allow the broadcast frequency of 890 MHz to be transmitted.

A bandwidth of 300 KHz is required. The transmit requirements were to reject image frequencies and local oscillator leakage while passing the modulated transmit signal. The filter had to have a very carefully specified phase distortion in order that the global phase specification could be met at the antenna.

The filter specification for receive was mainly dominated by the blocking and intermodulation specifications. The use of a low IF frequency for demodulation meant that image rejection was the hardest specification, this could not be achieved in one filter alone.

The two requirements were then merged and played off against each other, the pass band requirement was set by the transmit requirement and the stop band was set by the receive requirements. The use of direct digital synthesis for modulation purposes also affected the pass band requirements.

Another factor dictating the choice of the first intermediate frequency is the possibility to use the circuit with only minor modifications in the PCN system. Here the receive broadcast frequency is 1925 MHz and the transmit broadcast frequency is 1830 MHz. The same first IF of 389 MHz can be used, and thus the same SAW filters employed, if the receive and transmit LO1 frequencies are set to 1536 and 1441 MHz respectively.

What is claimed is:

1. A radio frequency circuit for a transmitter/receiver in a time division multiple access system, the circuit comprising:

a transmit channel including a heterodyne transmitter, a receiver channel including a heterodyne receiver, a bidirectional intermediate frequency SAW filter shared by the transmit and receive channels, and means responsive to whether the circuit is transmitting or receiving to switch the intermediate frequency SAW filter to the transmit or receive channel, wherein there is a first receiving stage/final transmitting stage which has a local oscillator automatically switchable on transmit/receive to change frequency so that the first receive intermediate frequency and final transmit intermediate frequency are the same.

2. A radio frequency circuit as claimed in claim 1 wherein the switchable filter is a SAW filter.

3. A radio frequency circuit as claimed in claim 1 wherein the switchable filter is physically connected to both the transmit and receive circuits and switching is effected by control voltages applied to components in the transmit and receive circuits to switch the circuits on and off alternatively.

4. A radio frequency circuit as claimed in claim 1 wherein there are two intermediate frequencies, the first (in the direction of the receive channel) being in the range 350 to 450 MHz.

5. A radio frequency circuit as claimed in claim 1 wherein the first intermediate frequency is in the range 380 to 420 MHz.

6. A radio frequency circuit as in claim 1, wherein the transmit channel further comprises a direct digital synthesis modulator and the receive channel further comprises a direct digital synthesis demodulator.

7. A radio frequency circuit as claimed in claim 1 wherein there are two intermediate frequencies, the second (in the direction of the receive channel) being in the range 80 to 160 MHz.

8. A radio frequency circuit as claimed in claim 7 wherein the second intermediate frequency is in the range 120 to 140 MHz.

9. A radio frequency circuit as claimed in claim 8 wherein there is provided a transconductance-C active filter in the receive channel for filtering the signal resulting from heterodyning the second intermediate frequency.

* * * * *